2,888,502

ANTIOZIDATION OF RUBBER WITH 2,6 DIALKOXY-4-ALLYL PHENOL

William K. T. Gleim, Island Lake, Ill., assignor, by mesne assignments, to Universal Oil Products Company, Des Plaines, Ill., a corporation of Delaware No Drawing. Application December 29, 1955
Serial No. 556,035

9 Claims. (Cl. 260—757)

This invention relates to the antiozidation of rubber, and more particularly to a novel method of retarding cracking of rubber due to ozone.

It is only comparatively recently that the cracking of rubber has been recognized as being caused by ozone. The neglect of the ozone problem has several causes, among which may be mentioned (1) the incredibility of the concept that a material in such a low concentration in the atmosphere would play a major role in causing degradation reactions, (2) the wide-spread practice of wrapping tires and other rubber products with paper, etc. The practice of wrapping the rubber product with paper is now known to have protected the rubber during storage by adsorption of the atmospheric ozone by the cellulosic material.

The recognition of the ozone problem also has been emphasized by the study entered into as a result of military vehicles stored after World War II becoming unusable when pressed into service during the Korean War because of deterioration of the rubber tires and other rubber products. This stimulated an intensive investigation of the cause for such deterioration and it was found to be due to ozone cracking. The presence of ozone in the atmosphere appears to be increasing, apparently due to increased installations of high tension power equipment and also to the release of industrial and automotive combustion vapors into the atmosphere.

The cracking of rubber due to ozone is an entirely novel problem. This cracking is a surface reaction, and the resulting cracks appear to be the focal point for failure caused by flex fatigue. In the past it had been recognized that rubber deteriorates by oxidative reactions. Therefore, one of the attempted solutions to the ozone problem was a reinvestigation of the additives which were known to prevent oxidative deterioration. However, it was found that many of the antioxidants were of substantially no value in retarding cracking due to ozone and, in some cases, actually promoted undesired reactions. For example, additives such as 2,6-di-tert-butyl-p-cresol and 2,2'-methylene-bis-(4-methyl-6-tert-butyl-phenol), which are effective antioxidants, are reported to promote ozone attack. Also, N,N'-di-sec-butyl-p-phenylene diamine, which is a known antioxidant in gasoline, actually acted as a pro-oxidant in concentrations of two parts per 100 parts of rubber and above in oxygen, or in concentrations of one part per hundred parts of rubber and above in air. Therefore, in a concentration which appears to be required commercially for satisfactory protection against ozone cracking, the use of this additive will result in a rubber which reacts with molecular oxygen faster than is the case when the additive is omitted completely from the rubber. Another attempted solution to this problem was coating the rubber with a film of wax. However, it was found that cracks appeared in the wax film and this permitted the ozone to contact and cause cracking of the rubber.

From the above, it will be noted that the problem of ozone cracking is different from the problem of oxidative deterioration. Similarly, the problem of stabilizing rubber is different from the problem of stabilizing other substrates. For example, a satisfactory additive for rubber must not be too toxic or possess sensitivity properties which will prove harmful when used in rubber which contacts food products or which will prove to be a hazard when handled by men working with the rubber products. In addition to possessing high potency to retard ozone cracking, a satisfactory additive must possess the desired fugacity so that it will not be lost during compounding or in use at high temperatures.

In addition to all of the above strict requirements, an antiozidant for use in light colored rubber products must be non-staining. While it recently has been found that certain antiozidants are very effective, these antiozidants can not be used in light colored rubber or in dark colored rubber which is molded or otherwise joined to light colored rubber because of the discoloration caused by the antiozidant. The present invention provides a novel antiozidant which is both very effective and non-staining.

As hereinbefore set forth, the novel antiozidant of the present invention is of especial utility in preventing ozone cracking of light colored rubber. Most of the light colored rubber now being manufactured commercially is prepared from natural rubber and, therefore, the present invention is particularly applicable for use in the light colored natural rubber. However, as also hereinbefore set forth, it is necessary that the dark colored rubber molded with or otherwise adjoining the light colored rubber also must contain a non-staining antiozidant, and the novel antiozidant of the present invention, therefore, is advantageously utilized in such dark colored rubber.

Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the present invention is particularly applicable for use in light colored natural rubber and the dark colored rubber associated therewith, it is understood that the present invention may be used for stabilization of other dark colored natural rubber. Similarly, the present invention may be utilized for preventing ozone cracking of synthetic rubber. Much of the synthetic rubber now being produced commercially is known in the art as GR–S rubber and is a copolymer of butadiene and styrene. Other synthetic rubbers include those produced from butadiene and acrylonitrile (Buna–N), butadiene and isobutylene (Butyl rubber), etc. Still other synthetic rubbers include Thiokol rubber, silicone rubber, neoprene rubber, etc.

In one embodiment the present invention relates to a method of preventing the cracking of a rubber due to ozone which comprises incorporating therein an antiozidative concentration of 2,6-dialkoxy-4-propenylphenol.

In a specific embodiment the present invention relates to a method of preventing the cracking of light colored rubber due to ozone which comprises incorporating in said rubber from about 0.25% to about 10% by weight of 2,6-dimethoxy-4-allylphenol.

In another embodiment the present invention relates to a rubber, particularly light colored natural rubber, stabilized against cracking due to ozone by incorporating in the rubber an antiozidative concentration of 2,6-dialkoxy-4-propenylphenol.

Any suitable 2,6-dialkoxy-4-propenylphenol may be employed in accordance with the present invention. The term "propenyl" is being used here in a generic sense to include compounds in which the double bond of the propenyl group is either in the alpha or beta position. Compounds having the double bond in the beta position are specifically referred to as "allyl," while compounds having the double bond in the alpha position are specifically referred to as "propenyl." Thus, the latter term is being used in the present specifications and claims both in the generic and in the specific sense.

Preferably, each of the alkoxy groups are the same and are selected from methoxy, ethoxy, propoxy and butoxy. Thus, the preferred compounds for use in the present invention include 2,6-dimethoxy-4-allylphenol, 2,6-diethoxy-4-allylphenol, 2,6-dipropoxy-4-allylphenol, 2,6-dibutoxy-4-allylphenol, 2,6-dimethoxy-4-propenylphenol, 2,6-diethoxy-4-propenylphenol, 2,6-dipropoxy-4-propenylphenol and 2,6-dibutoxy-4-propenylphenol.

In general, it is preferred that the alkyl portion of the alkoxy radicals is a straight chain. However, in some cases, the alkyl portion may be of branched chain as in compounds such as 2,6-diisopropoxy-4-allylphenol, 2,6-diisopropoxy-4-propenylphenol, 2,6-di-tert-butoxy-4-allylphenol, 2,6-di-tert-butoxy-4-propenylphenol, etc.

As hereinbefore set forth, the preferred antiozidant of the present invention is a symmetrical compound; that is, both of the alkoxy groups are the same. However, in some cases, the alkoxy groups may be different as illustrated by the following compounds: 2-methoxy-6-ethoxy-4-allylphenol, 2-methoxy-6-ethoxy-4-propenylphenol, 2-methoxy-6-propoxy-4-allylphenol, 2-methoxy-6-propoxy-4-propenylphenol, 2-methoxy-6-butoxy-4-allylphenol, 2-methoxy-6-butoxy-4-propenylphenol, etc., 2-ethoxy-6-propoxy-4-allylphenol, 2-ethoxy-6-propoxy-4-propenylphenol, 2-ethoxy-6-butoxy-4-allylphenol, 2-ethoxy-6-butoxy-4-propenylphenol, etc., 2-propoxy-6-butoxy-4-allylphenol, 2-propoxy-6-butoxy-4-propenylphenol, etc.

From the above description, it will be noted that a number of different compounds may be prepared and used in accordance with the present invention. However, it is understood that these compounds are not necessarily of equivalent potency. The specific compound to be used will depend upon availability and/or cost of preparation and effectiveness in the particular rubber to be stabilized.

In the preparation of the 2,6-dialkoxy-4-propenylphenol, polymerization may occur and it is within the scope of the present invention to utilize the polymerized product, either alone but preferably in admixture with the monomer. It is also within the scope of the present invention to utilize a mixture of two or more different 2,6-dialkoxy-4-propenylphenols, the specific compounds preferably being selected from those hereinbefore set forth.

It is understood that the antiozidant of the present invention can be utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozidant of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

In general, the antiozidant is utilized in a concentration of from about 0.25% to about 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozidant of the present invention is utilizable along with other additives incorporated in rubber for specific purposes including, for example, antioxidants, accelerators, softeners, extenders, wax, reinforcing agents, etc.

The antiozidant of the present invention normally is employed along with certain commercial antioxidants which are incorporated in the latex prior to milling with the other components of the rubber. In this embodiment, the antiozidant of the present invention thus is used along with a separate antioxidant. Any suitable antioxidant may be employed including, for example, phenyl-beta-naphthylamine, 6 - phenyl - 2,2,4 - trimethyl-1,2-dihydroquinoline, marketed under the trade name of "Santoflex-B," 2,2'-methylene - bis-(4-methyl-6-tert-butylphenol), 2,6-di-tert-butyl-p-cresol, the reaction product of acetone and diphenylamine, marketed under the trade name of "B.L.E.," etc. These antioxidants generally are used in a concentration of from about 0.5% to about 3% by weight of the rubber.

The antiozidant of the present invention also normally is employed along with paraffin and/or microcrystalline wax. The wax generally is utilized in a concentration of from about 0.5% to about 3% by weight of the rubber.

In one embodiment, the antiozidant of the present invention is admixed with the antioxidant and/or wax, and the mixture then is composited with one or more of the other components of the rubber composition.

The antiozidant of the present invention is incorporated in rubber or rubbery products in any suitable manner and at any suitable stage of preparation. When the antiozidant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following example is introduced to illustrate further the novelty and utility of the present invention, but not with the intention of unduly limiting the same.

The data reported in this example were obtained from rubber samples being manufactured by one of the rubber companies and marketed for commercial use. The rubber was cut into strips of 6.00" x 0.5" x 0.075". In the sample containing additive, the additive was incorporated into the rubber sample by immersing and swelling the sample in a solution containing the additive and toluene as a solvent. The concentration of additive was selected to leave in the rubber sample, after the toluene had been removed, a concentration of additive of about 3 parts by weight per 100 parts by weight of rubber hydrocarbon. The rubber sample remained in the solution for about 16 hours and, after this time, the toluene was evaporated by exposing the sample to air at room temperature for two hours, followed by heating for one hour at about 195° F. in an air oven. After cooling, the sample was elongated 20% and mounted on a waxed wooden panel, along with the control sample (sample not containing the additive). The samples then were exposed in an ozone cabinet to air containing about 33 parts of ozone per 100 million parts of air at a temperature of about 100° F.

The antiozidant used in this example is 2,6-dimethoxy-4-allylphenol. It was synthesized by the general method of reacting 2,6-dimethoxyphenol with allyl bromide in the presence of potassium hydroxide. The resultant allyl ether of 2,6-dimethoxyphenol was rearranged by heating in the presence of a solvent to form 2,6-dimethoxy-4-allylphenol, which distilled at 157–165° C. at 15 mm.

2,6-dimethoxy-4-allylphenol, prepared in the above manner, was incorporated in a concentration of about 3 parts by weight per 100 parts by weight of rubber in the manner hereinbefore set forth.

The rubber used in this example is white natural rubber stock. In a control sample of the rubber (sample not containing the additive) visible cracks appeared in the rubber after 5 hours' exposure in the ozone cabinet. On the other hand, a sample of the rubber containing 2,6-dimethoxy-4-allylphenol, did not show visible cracks until after about 34 hours' exposure in the ozone cabinet. The sample of rubber containing the additive was only very slightly discolored and would not be objectionable for use in most light colored rubber products.

From the data in the above example, it will be noted that the antiozidant of the present invention served to considerably retard cracking of the rubber due to ozone.

I claim as my invention:

1. Rubber normally subject to cracking by the action of ozone containing from about 0.25% to about 10% by weight of 2,6-dialkoxy-4-propenylphenol in which each of the alkoxy groups contains from 1 to about 4 carbon atoms, the amount of said compound being sufficient to retard the cracking effect of ozone on the rubber.

2. Light colored natural rubber normally subject to cracking by the action of ozone containing 2,6-dimethoxy-4-allylphenol in an amount of from about 0.25% to about 10% by weight, sufficient to retard the cracking effect of ozone on the rubber, without causing staining of said light colored rubber.

3. Light colored natural rubber normally subject to cracking by the action of ozone containing 2,6-dimethoxy-4-propenylphenol in an amount of from about 0.25% to about 10% by weight, sufficient to retard the cracking effect of ozone on the rubber, without causing staining of said light colored rubber.

4. Light colored natural rubber normally subject to cracking by the action of ozone containing 2,6-diethoxy-4-allylphenol in an amount of from about 0.25% to about 10% by weight, sufficient to retard the cracking effect of ozone on the rubber, without causing staining of said light colored rubber.

5. Light colored natural rubber normally subject to cracking by the action of ozone containing 2,6-diethoxy-4-propenylphenol in an amount of from about 0.25% to about 10% by weight, sufficient to retard the cracking effect of ozone on the rubber without causing staining of said light colored rubber.

6. Light colored natural rubber normally subject to cracking by the action of ozone containing 2,6-dipropoxy-4-allylphenol in an amount of from about 0.25% to about 10% by weight, sufficient to retard the cracking effect of ozone on the rubber, without causing staining of said light colored rubber.

7. Dark colored rubber normally subject to cracking by the action of ozone, said dark colored rubber adjoining light colored rubber, said dark colored rubber containing from about 0.25% to about 10% by weight of 2,6-dialkoxy-4-propenylphenol in which each of the alkoxy groups contains from 1 to about 4 carbon atoms, the amount of said compound being sufficient to retard the cracking effect of ozone on the rubber, without causing staining of said light colored rubber.

8. Rubber normally subject to cracking by the action of ozone and to oxidative deterioration by the action of oxygen containing from about 0.25% to about 10% by weight of 2,6-dialkoxy-4-propenylphenol in which each of the alkoxy groups contains from 1 to about 4 carbon atoms, the amount of said compound being sufficient to retard said cracking, and from about 0.5% to about 3% by weight of a rubber antioxidant.

9. The rubber of claim 8 also containing from about 0.5 to about 3% by weight of wax.

References Cited in the file of this patent

UNITED STATES PATENTS

| 2,378,698 | Gibbs | June 19, 1945 |
| 2,679,459 | Rosenwald | May 25, 1954 |
| 2,682,474 | Knowles et al. | June 29, 1954 |

FOREIGN PATENTS

| 577,875 | Great Britain | June 4, 1946 |

OTHER REFERENCES

ICI (German patent application) I 10,026 (K1 39b, Gr. 8) October 25, 1956.